(12) United States Patent
Chou

(10) Patent No.: US 10,215,231 B2
(45) Date of Patent: Feb. 26, 2019

(54) BEARING STRUCTURE WITH CLOSE FIT

(71) Applicant: ASIA VITAL COMPONENTS CO., LTD., New Taipei (TW)

(72) Inventor: Chu-Hsien Chou, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 0 days.

(21) Appl. No.: 15/633,711

(22) Filed: Jun. 26, 2017

(65) Prior Publication Data

US 2018/0372156 A1 Dec. 27, 2018

(51) Int. Cl.
*F16C 33/06* (2006.01)

(52) U.S. Cl.
CPC .......... *F16C 33/06* (2013.01); *F16C 2360/46* (2013.01)

(58) Field of Classification Search
CPC .. F16C 35/067; F16C 35/061; F16C 2360/46; F16C 33/06; F04D 29/059; F04D 29/056; F04D 29/0563; F04D 29/0462; F04D 29/04; F04D 29/049; F04D 25/062; H02K 7/09
See application file for complete search history.

(56) References Cited

U.S. PATENT DOCUMENTS

| | | | | |
|---|---|---|---|---|
| 4,529,324 A * | 7/1985 | Champagne | .......... | F16C 25/083 384/518 |
| 4,809,833 A * | 3/1989 | Brunken | .................. | F16C 19/52 192/110 B |
| 4,955,791 A | 9/1990 | Wrobel | | |
| 5,638,233 A * | 6/1997 | Ishizuka | .............. | G11B 17/038 360/99.09 |
| 5,982,066 A * | 11/1999 | Marracino | .............. | F16C 35/04 310/67 R |
| 5,997,183 A * | 12/1999 | Horng | .................. | F16C 35/061 384/517 |
| 6,267,567 B1 * | 7/2001 | Hsieh | .................. | F04D 29/0513 417/354 |
| 6,488,483 B1 * | 12/2002 | Hsieh | .................... | F04D 29/051 417/354 |
| 6,538,355 B1 * | 3/2003 | Horng | ..................... | F16C 17/08 310/194 |
| 6,849,978 B2 * | 2/2005 | Sun | ........................ | F04D 29/058 310/90 |
| 6,916,160 B2 * | 7/2005 | Obara | ..................... | F04D 25/08 417/354 |
| 7,554,236 B2 * | 6/2009 | Lin | ...................... | H02K 5/1735 310/67 R |

(Continued)

FOREIGN PATENT DOCUMENTS

| CN | 202707575 U | 1/2013 |
|---|---|---|
| CN | 206071905 U | 4/2017 |

(Continued)

*Primary Examiner* — Alan B Waits
(74) *Attorney, Agent, or Firm* — C. G. Mersereau; DeWitt LLP

(57) ABSTRACT

The present invention relates to a bearing structure with a close fit, which comprises a fan frame having a base and a shaft sleeve disposed vertically. The shaft sleeve has a receiving space in which a bearing set is disposed. At least one external ring is sleeved around the outer perimeter of the shaft sleeve and is disposed corresponding to the bearing set. Therefore, by means of the external ring, the close fit between the shaft sleeve and the bearing set is improved, which increases the assembly precision.

6 Claims, 5 Drawing Sheets

(56) References Cited

U.S. PATENT DOCUMENTS

| | | | |
|---|---|---|---|
| 7,834,501 B2 | 11/2010 | Childe et al. | |
| 9,394,912 B2* | 7/2016 | Chang | F04D 25/064 |
| 9,887,602 B2* | 2/2018 | Shen | H02K 5/1672 |
| 9,897,109 B2* | 2/2018 | Shen | F04D 29/668 |
| 2002/0031428 A1* | 3/2002 | Li | F04D 29/059 |
| | | | 415/229 |
| 2004/0136842 A1* | 7/2004 | Obara | F04D 29/057 |
| | | | 417/354 |
| 2005/0185866 A1* | 8/2005 | Ku | F16C 17/02 |
| | | | 384/129 |
| 2008/0031736 A1* | 2/2008 | Liao | F04D 25/0613 |
| | | | 416/133 |
| 2009/0035162 A1* | 2/2009 | Yan | F04D 29/051 |
| | | | 417/423.7 |
| 2009/0051231 A1* | 2/2009 | Lin | F16C 19/52 |
| | | | 310/51 |
| 2009/0155055 A1* | 6/2009 | Chu | F04D 29/057 |
| | | | 415/142 |
| 2009/0220360 A1* | 9/2009 | Zhang | F04D 29/051 |
| | | | 417/354 |
| 2010/0071641 A1* | 3/2010 | Furukubo | B21J 9/06 |
| | | | 123/90.1 |
| 2011/0318200 A1* | 12/2011 | Takeshita | F04D 29/646 |
| | | | 417/321 |
| 2012/0171024 A1* | 7/2012 | Liu | F04D 29/646 |
| | | | 415/174.2 |
| 2013/0119801 A1* | 5/2013 | Smirnov | F16C 33/763 |
| | | | 310/90 |
| 2013/0156573 A1* | 6/2013 | Kaji | F01D 25/162 |
| | | | 415/229 |
| 2013/0163910 A1* | 6/2013 | Corona | F16C 35/061 |
| | | | 384/490 |
| 2014/0154108 A1* | 6/2014 | Hirosawa | F04D 25/062 |
| | | | 417/353 |
| 2017/0002837 A1* | 1/2017 | Shen | F04D 29/668 |

FOREIGN PATENT DOCUMENTS

| | | |
|---|---|---|
| TW | 488624 | 5/2002 |
| TW | 568192 | 12/2003 |
| TW | 579147 | 3/2004 |
| TW | M367979 U1 | 11/2009 |
| TW | M402944 U1 | 5/2011 |

* cited by examiner

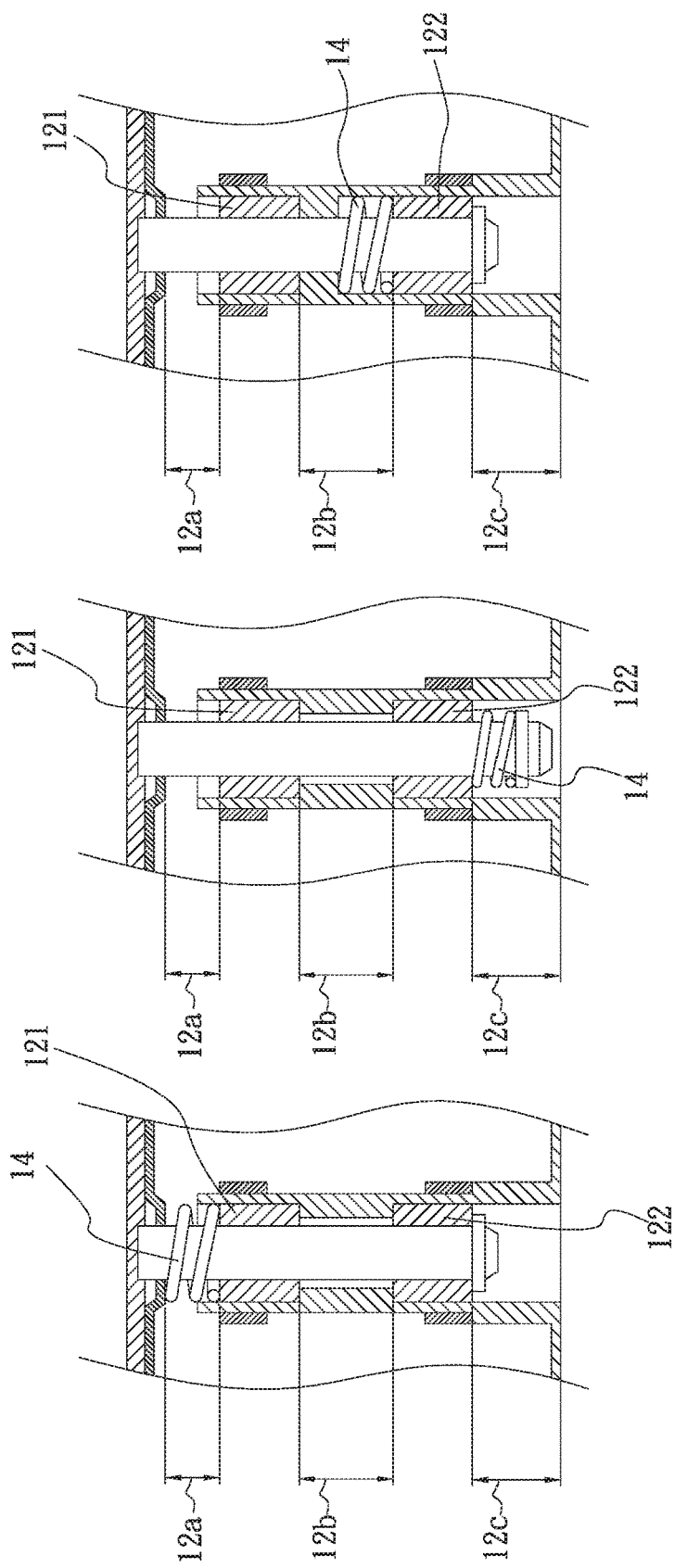

BEARING STRUCTURE WITH CLOSE FIT

BACKGROUND OF THE INVENTION

Field of the Invention

The present invention relates to a bearing structure with a close fit and in particular to a bearing structure with a close fit, which can increase the assembly precision of the shaft sleeve and the bearings.

Description of Prior Art

The bearing is widely used in the application requiring the placement of the rotating shaft. The main function of the bearing is to reduce the friction force caused during the rotation of the shaft to smooth the shaft rotation. The bearing is most commonly used in the motor and the fan. In particular, to reduce the noise made by the fan rotation and to reduce the wearing of the shaft, the bearing is usually installed in the shaft sleeve such that the fan can rotate smoothly and have a longer lifetime. The combination between the bearing and the shaft sleeve of the fan is mainly made by the integral overmolding or by the close fit with dispensing. If the method of the close fit is used, a suitable tolerance between the shaft sleeve and the bearing has to be provided. The tight tolerance is prone to damage the bearing; the loose tolerance cannot provide an effective fixing. Therefore, a higher machining precision is required and thus a higher cost is incurred.

In addition, the dispensing process is relative cheap but is more difficult, which tends to suffer the problem of contaminating other parts due to overflow of the excessive glue.

The cost of mold design for the integral overmolding is relatively high and the difficulty of removing the molded objects from the mold has to be considered, which tends to decrease the yield rate and increase the manufacturing cost.

Therefore, how to solve the problems of the prior art is the target the industry currently strives to reach.

SUMMARY OF THE INVENTION

Thus, to effectively overcome the above problems, the main objective of the present invention is to provide a bearing structure with a close fit which can improve the installation precision of the bearing and reduce the assembly cost.

To achieve the above objective, the present invention provides a bearing structure with a close fit, which comprises a fan frame. The fan frame has a base and a shaft sleeve disposed vertically. The shaft sleeve has a receiving space in which a bearing set is disposed. At least one external ring is sleeved around the outer perimeter of the shaft sleeve and is disposed corresponding to the bearing set.

To achieve the above objective, the present invention provides a bearing structure with a close fit, which comprises a fan frame, a shaft sleeve, a bearing set, and an outer ring set.

The fan frame has a base. The shaft sleeve is inserted into the base and has a receiving space. The bearing set is disposed in the receiving space. The outer ring set has a first outer ring and a second outer ring. The first outer ring is sleeved around the shaft sleeve in which the bearing set is disposed correspondingly; the second outer ring is disposed between the shaft sleeve and the base.

By means of the present invention, the disadvantages of the prior art such as the difficult control of precise tolerance and the high manufacturing cost can be overcome. Also, the assembly time can be dramatically reduced.

BRIEF DESCRIPTION OF DRAWING

FIG. 5a is an assembled cross-sectional view of the bearing structure with a close fit according to the third embodiment of the present invention;

FIG. 5b is another assembled cross-sectional view of the bearing structure with a close fit according to the third embodiment of the present invention; and FIG. 5c is yet another assembled cross-sectional view of the bearing structure with a close fit according to the third embodiment of the present invention.

DETAILED DESCRIPTION OF THE INVENTION

The above objectives, structural and functional characteristics of the present invention will be described according to the preferred embodiments in the accompanying drawings.

Figure 1:
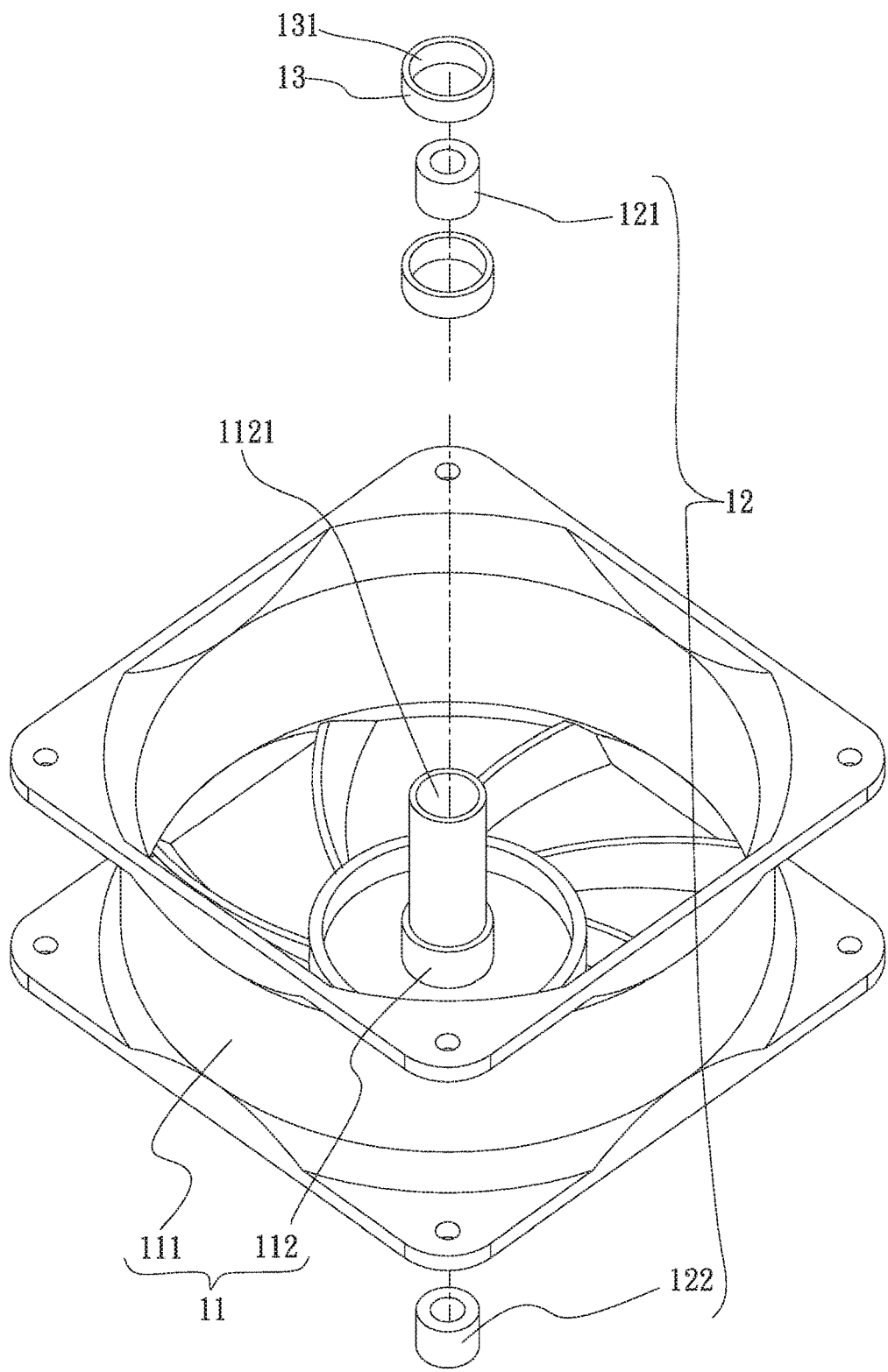
FIG. 1 is a perspective exploded view of the bearing structure with a close fit according to the first embodiment of the present invention.
Figure 2:
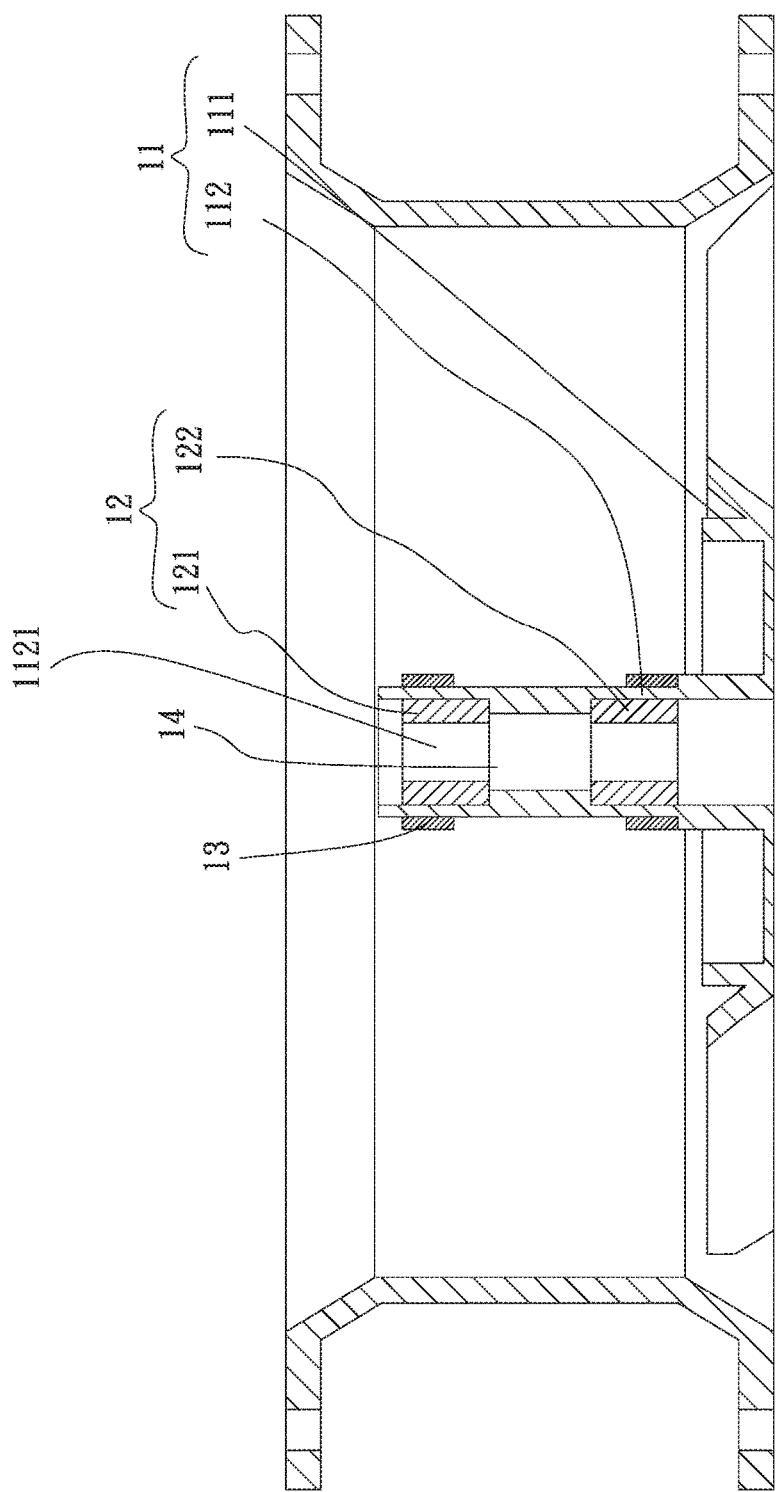
FIG. 2 is an assembled cross-sectional view of the bearing structure with a close fit according to the first embodiment of the present invention.

Please refer to FIGS. 1 and 2, which are the perspective exploded view and the assembled cross-sectional view of the bearing structure with a close fit according to the first embodiment of the present invention, respectively. As shown in FIGS. 1 and 2, the bearing structure with a close fit comprises a fan frame 11.

The fan frame 11 has a base 111 and a shaft sleeve 112 disposed vertically. The shaft sleeve 112 has a receiving space 1121 in which a bearing set 12 is disposed. At least one external ring 13 is sleeved around the outer perimeter of the shaft sleeve 112 and is disposed corresponding to the bearing set 12.

The bearing set 12 has a first bearing 121 and a second bearing 122. The first bearing 121 and the second bearing 122 are disposed in the receiving space 1121 of the shaft sleeve 112 and spaced to each other.

The shaft sleeve 112 and the bearing set 12 together define a first zone 12a, a second zone 12b, and a third zone 12c. The first zone 12a is disposed above the first bearing 121. The second zone 12b is disposed between the first bearing 121 and the second bearing 122. The third zone 12c is disposed below the second bearing 122.

The external ring 13 has a socket portion 131 which is sleeved around the outer perimeter of the shaft sleeve 112 in which the bearing set 12 is disposed correspondingly. The shaft sleeve 112 is made of metal material which is copper, iron, or aluminum, or made of non-metal material. The shaft sleeve 112 is combined with the fan frame 11 to integrally form a single structure by integral plastic overmolding.

Figure 3:
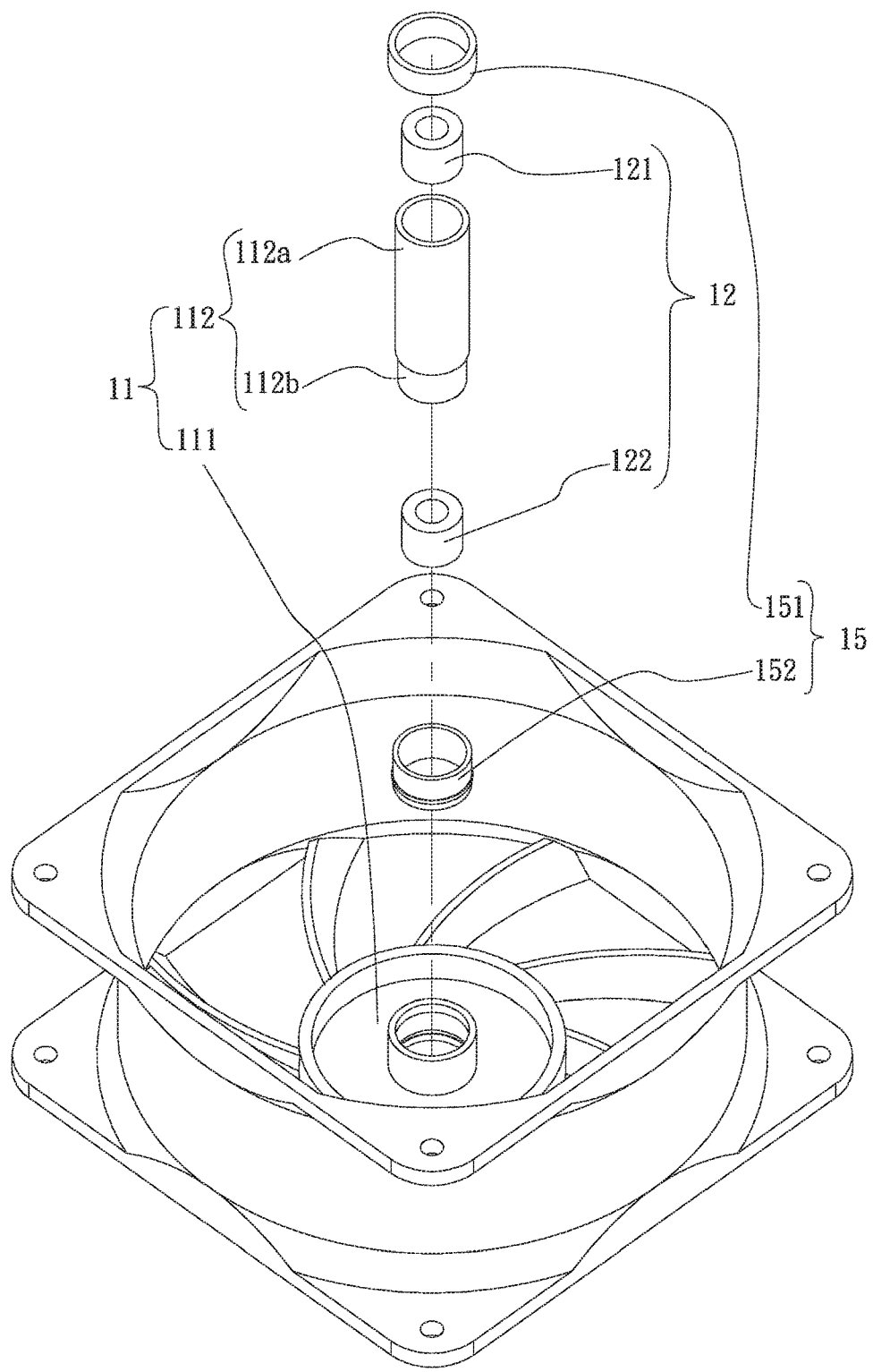
FIG. 3 is a perspective exploded view of the bearing structure with a close fit according to the second embodiment of the present invention.
Figure 4:
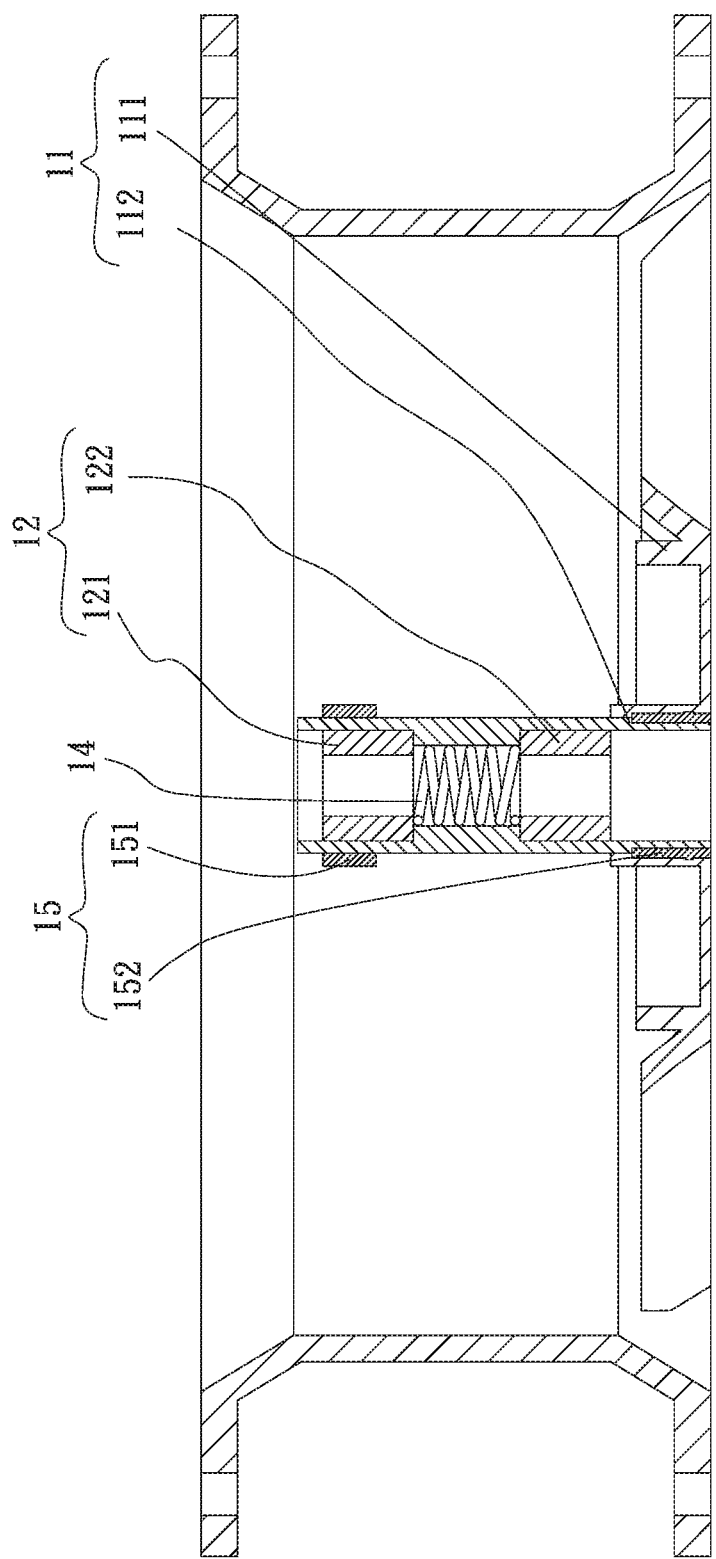
FIG. 4 is an assembled cross-sectional view of the bearing structure with a close fit according to the second embodiment of the present invention.

Please refer to FIGS. 3 and 4, which are the perspective exploded view and the assembled cross-sectional view of the bearing structure with a close fit according to the second embodiment of the present invention, respectively. As shown in FIGS. 3 and 4, part of the bearing structure in the current embodiment is the same as that in the first embodiment and will not be described again here. The difference between the first and the second embodiments is that in the second embodiment, the shaft sleeve 112 and the fan frame 11 are not formed integrally. The bearing structure with a close fit in the current embodiment comprises a fan frame 11, a shaft sleeve 112, a bearing set 12, and an outer ring set 15.

The fan frame 11 has a base 111. The shaft sleeve 112 is inserted into the base 111 and has a receiving space 1121.

The bearing set 12 is disposed in the receiving space 1121. The bearing set 12 has a first bearing 121 and a second bearing 122. The first bearing 121 and the second bearing 122 are disposed in the receiving space 1121 of the shaft sleeve 112 and spaced to each other. The outer ring set 15 has a first outer ring 151 and a second outer ring 152. The first outer ring 151 is sleeved around the shaft sleeve 112 in which the first bearing 14 is disposed correspondingly. The second outer ring 152 is disposed on the inner side of the base 111 and disposed between the shaft sleeve 112 and the base 111.

The shaft sleeve 112 can be inserted into and combined with the base 111 in a detachable way. Also, the shaft sleeve 112 has a first end 112a and a second end 112b; the shaft sleeve 112 is inserted into and combined with the base 111 of the fan frame 11 through the second end 112b. The second outer ring 152 is disposed near the second end 112b of the shaft sleeve 112. That is, the second outer ring 152 is firstly sleeved around the shaft sleeve 112 and then the two combined parts are placed together to touch the base 111 of the fan frame 11 and are finally combined with the base 111.

The second outer ring 152 can also be overmolded with the base 111. That is, after the second outer ring 152 is overmolded by injection with the base 111, the end of the shaft sleeve 112 at which the second bearing 122 is disposed is inserted into the base 111 with which the second outer ring 152 is overmolded such that the second bearing 122 in the shaft sleeve 112 is held firmly.

Please refer to FIGS. 5a, 5b, and 5c, which are the assembled cross-sectional views of the bearing structure with a close fit according to the third embodiment of the present invention. The current embodiment and the drawings thereof mainly disclose another part, a first spring 14. The first spring 14 is selected to be disposed in any of the first zone 12a, the second zone 12b, and the third zone 12c. The current embodiment is described below, referring to the following drawings. As shown in FIG. 5a, the first spring 14 is disposed in the first zone 12a, above the first bearing 121; as shown in FIG. 5b, the first spring 14 is disposed in the second zone 12b, between the first bearing 121 and the second bearing 122; as shown in FIG. 5c, the first spring 14 is disposed in the third zone 12c, below the second bearing 122.

The bearing set 12 disclosed in the present invention can be selected from sleeve bearings or ball bearings. The present invention uses the ball bearings as an explanatory example, but not limited to this.

The present invention mainly uses the external ring 13 or the outer ring set 15 which is sleeved around the shaft sleeve 112 in which the bearing set 12 is disposed correspondingly. In this way, the fit precision between the bearing set 12 and the shaft sleeve 112 is increased, further overcoming the considerable working time and the high manufacturing cost which are both caused by the requirements of the close fit for the prior art.

What is claimed is:

1. A bearing structure, comprising:
   a fan frame having a base;
   a shaft sleeve inserted into the base and having a receiving space;
   a bearing set disposed in the receiving space;
   an outer ring set having a first outer ring and a second outer ring, wherein the first outer ring is sleeved around the shaft sleeve in which the bearing set is disposed correspondingly, wherein the second outer ring is disposed on the inner side of the base and disposed between the shaft sleeve and the base; and
   wherein the shaft sleeve has a first end a second end, wherein the second end is inserted into and combined with the base of the fan frame in a detachable way, wherein the second outer ring is disposed near the second end of the shaft sleeve.

2. The bearing structure according to claim 1, wherein the shaft sleeve is made of metal material which is copper, iron, or aluminum, or made of non-metal material.

3. The bearing structure according to claim 1, wherein the hearing set has a first bearing and a second bearing, wherein the first bearing and the second bearing are disposed in the receiving space of the shaft sleeve and spaced to each other, wherein the first outer ring is sleeved around the shaft sleeve on which the first hearing is disposed correspondingly.

4. The bearing structure according to claim 3, wherein the shaft sleeve and the bearing set together define a first zone, a second zone, and a third zone, wherein the first zone is disposed above the first hearing, wherein the second zone is disposed between the first hearing and the second bearing, wherein the third zone is disposed below the second hearing.

5. The bearing structure according to claim 4, further comprising at least one first spring disposed in any of the first zone, the second zone, and the third zone.

6. The bearing structure according to claim 1, wherein the second outer ring and the base are integrally overmolded.

* * * * *